(12) United States Patent
Saint et al.

(10) Patent No.: US 6,851,617 B2
(45) Date of Patent: Feb. 8, 2005

(54) LASER IMAGEABLE RFID LABEL/TAG

(75) Inventors: André M. Saint, Tonawanda, NY (US); Omar S. Attia, Lakeview, NY (US)

(73) Assignee: Avery Dennison Corporation, Pasadena, CA (US)

( * ) Notice: Subject to any disclaimer, the term of this patent is extended or adjusted under 35 U.S.C. 154(b) by 103 days.

(21) Appl. No.: 10/126,302

(22) Filed: Apr. 19, 2002

(65) Prior Publication Data

US 2003/0197064 A1 Oct. 23, 2003

(51) Int. Cl.[7] .............................................. G06K 19/06
(52) U.S. Cl. ....................... 235/492; 235/375; 235/380; 235/382; 235/385; 235/451; 340/572.5; 340/572.7; 340/572.8
(58) Field of Search ................................ 235/492, 375, 235/380, 382, 385, 451; 340/572.5, 572.7, 572.8

(56) References Cited

U.S. PATENT DOCUMENTS

| | | | |
|---|---|---|---|
| 3,662,156 A | 5/1972 | Grosbard | |
| 3,810,566 A | 5/1974 | Adams et al. | |
| 3,876,865 A | 4/1975 | Bliss | |
| 4,417,413 A | 11/1983 | Hoppe et al. | |
| 4,552,383 A | 11/1985 | Hoppe et al. | |
| 4,631,223 A | 12/1986 | Sander | |
| 4,889,366 A | 12/1989 | Fabbiani | |
| 4,966,857 A | 10/1990 | Haghiri-Tehrani et al. | |
| 5,042,842 A | 8/1991 | Green et al. | |
| 5,059,949 A | 10/1991 | Caparoni et al. | |
| 5,166,501 A | 11/1992 | Woolley | |
| 5,356,717 A | 10/1994 | Choki et al. | |
| 5,489,123 A | 2/1996 | Roshkoff | |
| 5,516,153 A | 5/1996 | Kaule | |
| 5,595,403 A | * | 1/1997 | Garrison ...................... 283/74 |
| 5,613,712 A | | 3/1997 | Jeffers |
| 5,688,738 A | | 11/1997 | Lu |
| 5,829,790 A | * | 11/1998 | Phillips ....................... 283/117 |
| 5,837,367 A | | 11/1998 | Ortiz, Jr. et al. |
| 5,867,102 A | * | 2/1999 | Souder et al. ........... 340/572.8 |
| 5,888,624 A | * | 3/1999 | Haghiri et al. .............. 428/195 |
| 5,924,738 A | | 7/1999 | Konkol et al. |
| 5,982,284 A | | 11/1999 | Baldwin et al. |
| 6,054,170 A | * | 4/2000 | Chess et al. .................... 427/7 |
| 6,130,613 A | * | 10/2000 | Eberhardt et al. ........ 340/572.7 |
| 6,147,604 A | * | 11/2000 | Wiklof et al. ............ 340/572.1 |
| 6,390,375 B2 | * | 5/2002 | Kayanakis ................... 235/492 |
| 6,497,371 B2 | * | 12/2002 | Kayanakis et al. ......... 235/492 |
| 6,547,151 B1 | * | 4/2003 | Baldi ......................... 235/492 |

FOREIGN PATENT DOCUMENTS

WO  WO 99/41721  8/1999

* cited by examiner

Primary Examiner—Michael G. Lee
Assistant Examiner—Steven S. Paik
(74) Attorney, Agent, or Firm—Renner, Otto, Boisselle & Sklar, LLP

(57) ABSTRACT

Radio-frequency identification (RFID) tags and labels are produced having customized variable imprinting. Sheets of paper are used to form a simple and inexpensive structure for supporting and protecting RFID transponders. The paper structure also serves as a surface for customized variable imprinting using laser printers. The structure includes a base sheet, a cover sheet upon which a laser printer applied image is formed by passing the sheet assembly through a print path of a laser printer, and a mask sheet having at least one window. The sheets form a protective pocket within the window for protecting an electronic circuit from the heat and pressure applied by the laser printer when printing an image on the cover sheet. After printing, the structure can be separated into multiple RFID tags or labels. Identification information is transmitted from the electronic circuits inside the protective pockets to an external receiver.

36 Claims, 2 Drawing Sheets

LASER IMAGEABLE RFID LABEL/TAG

BACKGROUND OF THE INVENTION

1. Field of the Invention

This invention relates to the field of Radio Frequency Identification (RFID) tags and labels, and more particularly to particular structures of RFID tags and labels and methods of manufacturing them.

2. General Background and State of the Art

RFID systems consist of a number of components including tags, handheld or stationary readers, data input units and system software. The tags are the backbone of the technology and come in various shapes, sizes and read ranges including thin and flexible "smart labels" which can be laminated between paper or plastic.

RFID creates an automatic way to collect information about a product, place, time or transaction quickly, easily and without human error. It provides a contactless data link, without need for line of sight or concerns about harsh or dirty environments that restrict other automatic ID technologies such as bar codes.

In addition, RFID is more than just an ID code, it can be used as a data carrier, with information being written to and updated on the tag on the fly.

RFID has been applied to hundreds of applications in dozens of key industries. Today, RFID is used for such applications as vehicle and personnel access control, automotive anti-theft systems, product and asset tracking and supply chain automation. Additional applications include payment and loyalty, personal and vehicle and personnel access control, automotive security, product and asset tracking, sports timing, livestock identification, document management and supply chain automation.

In one application RFID is used as part of a gas-station payment system using radio frequency signals to enable two-way, wireless communication between a key ring tag and a gasoline pump or counter-top reader. The desired purchase is automatically charged to a gas-station customer's credit card of choice without swiping a credit card or paying an attendant.

Prior art RFID tags and labels typically come in roll form. Some of these tags and labels include images on their surfaces. Typically the images are created using thermal transfer or direct thermal technology. This technology is preferred because the RFID circuits are not exposed to undue stress such as pressure or heat. However, there is a segment of the hard good distribution market that batch prints shipping labels via laser printers. Unlike thermal transfer technology, laser printing exposes the throughput media to pressure and heat. In this and other applications it would be desirable to be able to batch print tags or labels having RFID capabilities. There is a strong need in the art for an RFID tag or label that is imageable using laser printing.

INVENTION SUMMARY

A general object of the present invention is to provide an RFID tag or label that is imageable using laser printing without damaging the RFID circuit. Another object of the present invention is to provide a method for manufacturing such an RFID tag or label.

To achieve these goals, RFID tags and labels are produced having customized variable imprinting. Sheets of paper are used to form a simple and inexpensive structure for supporting and protecting RFID transponders. The paper structure also serves as a surface for customized variable imprinting using laser printers. The structure includes a base sheet, a cover sheet upon which a laser printer applied image is formed by passing the sheet assembly through a print path of a laser printer, and a mask sheet having at least one window. The sheets form a protective pocket within the window for protecting an electronic circuit from the heat and pressure applied by the laser printer when printing an image on the cover sheet. After printing, the structure can be separated into multiple RFID tags or labels. Identification information is transmitted from the electronic circuits inside the protective pockets to an external receiver.

DETAILED DESCRIPTION OF THE PREFERRED EMBODIMENTS

While the specification describes particular embodiments of the present invention, those of ordinary skill can devise variations of the present invention without departing from the inventive concept.

The present invention provides an economical and convenient method for producing radio-frequency identification (RFID) tags and labels having customized variable imprinting. Standard sheets of paper can be used to form a simple and inexpensive structure for supporting and protecting RFID transponders. At the same time, the paper structure serves as a surface for customized variable imprinting using common and inexpensive laser printers.

Figure 1:
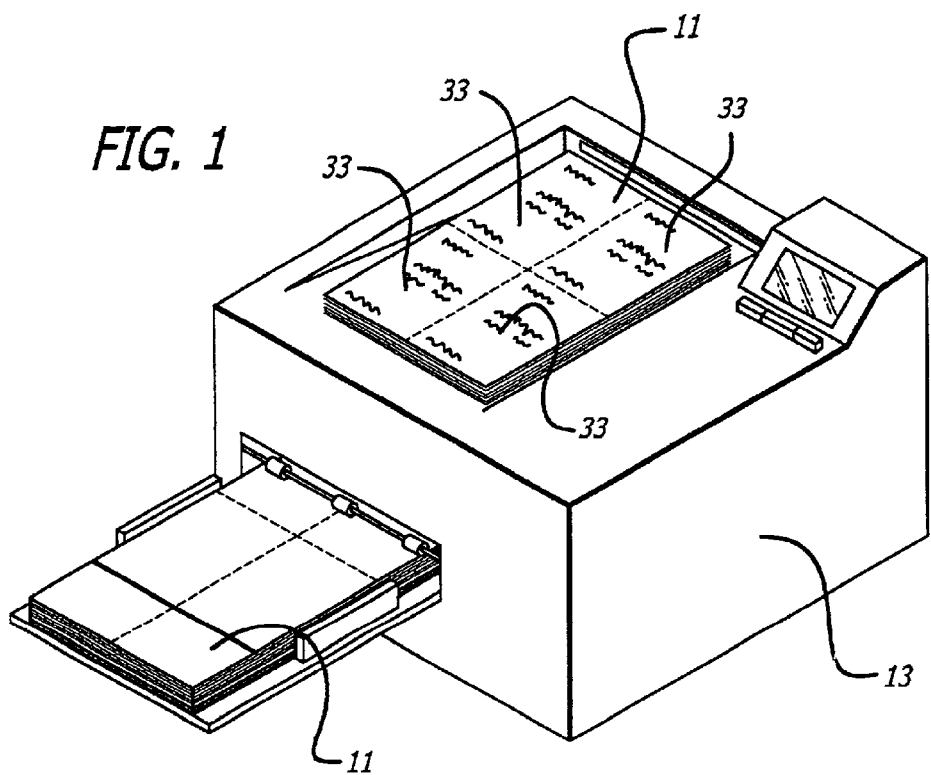
FIG. 1 shows a perspective view of a laser printer and the sheet assemblies prior to and following passing through the printer.

FIG. 1 shows imageable electronic-identification sheet assemblies 11 of the present invention both before and after being fed through a laser printer 13. Laser printer applied images 33 are printed onto the sheet assemblies 11. Each of the imageable electronic-identification sheet assemblies 11 is formed from a base sheet 15, a cover sheet 17 and a mask sheet 19 (see FIGS. 2 and 4). The mask sheet 17 has one or more windows 21 formed therein. Four windows 21 are illustrated in the exploded perspective view of an RFID tag or label sheet assembly of FIG. 4.

Figure 4:
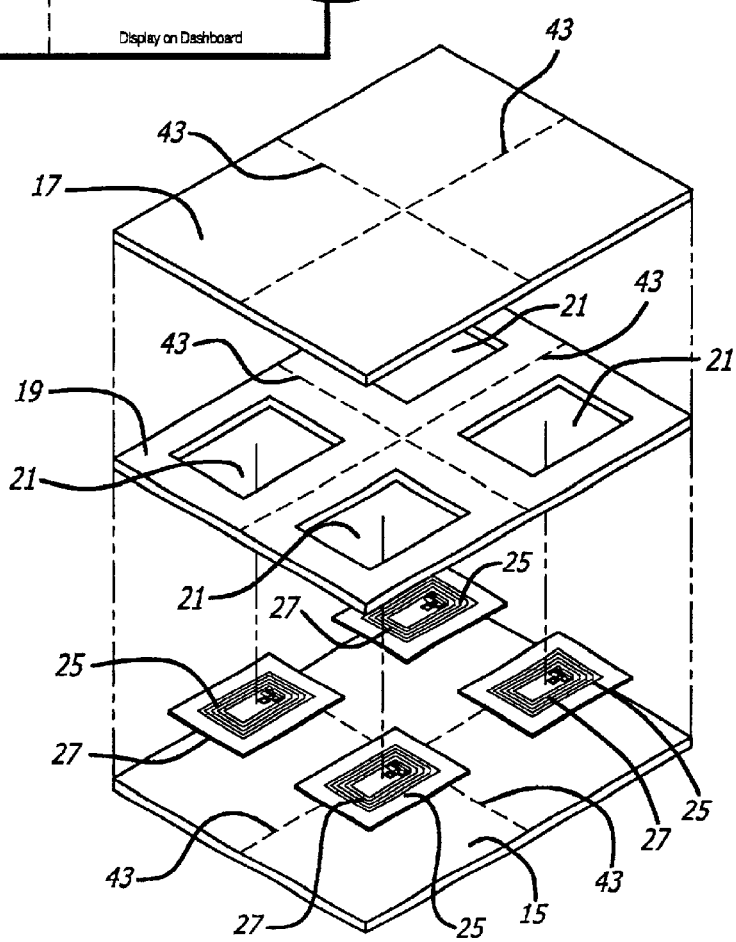
FIG. 4 is an exploded perspective view of an RFID tag or label sheet assembly.

The mask sheet 17 is bonded between the base 15 and cover sheets 17 to form one or more protective pockets 23. In the particular embodiment illustrated in FIG. 4, the four windows 21 form four protective pockets 23. Within each protective pocket 23 is one or more electronic circuits 25. Each electronic circuit 25 can be fit entirely within a protective pocket. The diagrammatic vertical cross-sectional view of a "protective pocket" region of an RFID tag or label of FIG. 2 in addition to FIG. 4 illustrates a single electronic circuit 25 within each of the protective pockets 23. The electronic circuit 25 can be, for example, an RFID transponder such as one from the Tag-it® HF-I Transponder Inlay series from TEXAS INSTRUMENTS.

The unique protective pockets 23 protect the electronic circuits 25 from the heat and pressure applied by the laser printer 13 when printing an image on the cover sheet 17. The walls forming the windows 21 of the mask 19 absorb some of the pressure exerted by the feed rollers of the laser printer 13. The base sheet 15 and cover sheet 17 also help to spread some of the pressure away from the electronic circuit 25. The base sheet 15 and cover sheet 17, in addition to the protective cavity 23, also serve to insulate and channel away the heat of the laser printing from the electronic circuit 25.

Figure 2:
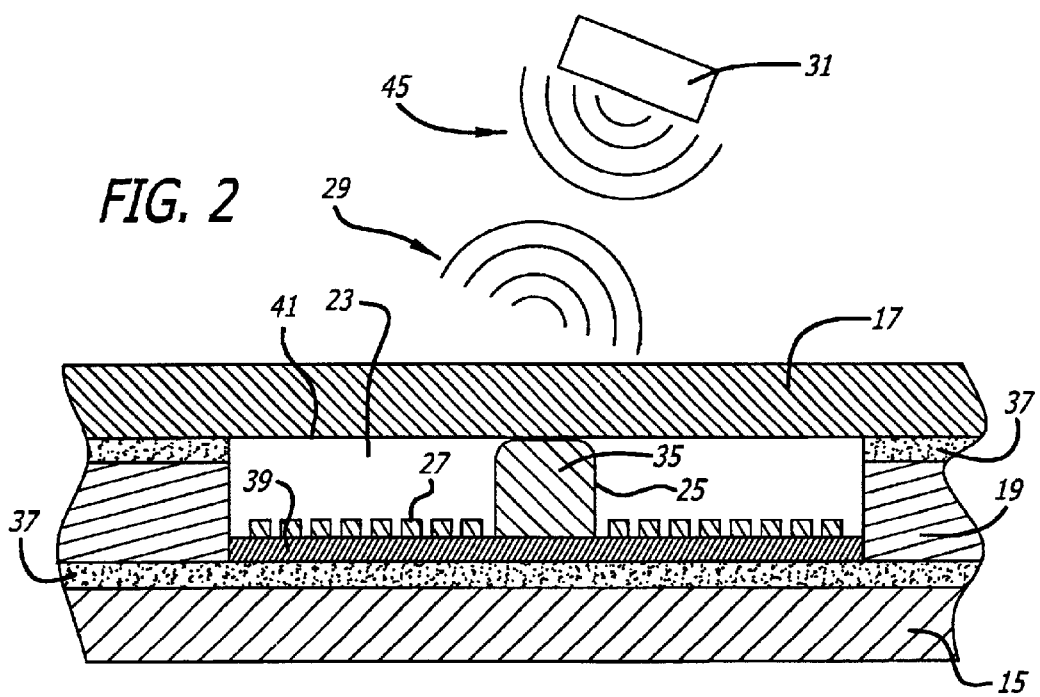
FIG. 2 is a diagrammatic vertical cross-sectional view of a "protective pocket" region of an RFID tag or label.

Within the protective pocket 23 is a transmission device 27 for communicating identification information 29 from the electronic circuit 25 to an external transceiver 31 outside the protective pocket 23. The transmission device 27 can be a helical antenna portion of the electronic circuit 25 as illustrated in FIGS. 2 and 4. The electronic circuit 25 includes a microchip 35 electrically connected to the transmission device 27.

The base sheet 15, cover sheet 17 and mask sheet 19 can be of any size that can be fed through a laser printer, however, 8½×11 inch, A-4 or other standard-size paper is desirable because of lower cost and greater compatibility with standard printers and software packages used to design the laser printer applied images 33.

The entire sheet assembly 11 should have a thickness such that it will fit through the laser printer 13 for printing the images 33. For use with standard laser printers, a sheet assembly thickness of less than 15 (fifteen) thousandths of an inch (mils) thick is generally appropriate for enabling feeding through a laser printer. The sheet assembly can be formed using permanent adhesive 37 to bond the base sheet 15 to the mask sheet 19 and the electronic circuit 25. In a particular embodiment, the electronic circuit 25 is formed on a mounting sheet 39 which is bonded to the base sheet 15 using the permanent adhesive 37. The mounting sheet 39 can be made from polyester. Rubber or other types of adhesives can be used to bond the sheet assembly together.

The base sheet 15 and cover sheet 17 can be 20 pound bond paper while the mask sheet 19 can be 60 pound or 80 pound bond paper, for example. The windows 21 can be approximately 6 cm×8.5 cm. These paper thicknesses and window sizes work well to protect the electronic circuits 25 from the pressure and heat of the laser printer. Of course other paper thickness and window sizes can be used as well with electronic circuits 25 of different footprints and with different laser printers. The base sheet 15 and cover sheet 17 can also have thicknesses approximately in the range of 3–4 mils while the mask sheet 19 can have a thickness approximately in the range of 3–8 mils and preferably approximately 6 mils. The layers of adhesive 37 holding the base sheet 15 and cover sheet 17 to the mask sheet 19 and holding the electronic circuit 25 to the base sheet can be approximately 1 mil thick. The electronic circuit can be 6 mils or less high in order to fit into the protective pocket 23. However, the height of the electronic circuit can vary in different embodiments. For example, if thinner paper is used for the base sheet 15 and the cover sheet 17 while thicker paper is used for the mask sheet 19, then a taller electronic circuit can be used while maintaining the thickness of the sheet assembly thin enough to pass through the laser printer 13. Similarly, using a thinner mounting sheet 39, or not using the mounting sheet 39 at all, allows for greater height within the protective pocket 23 for utilizing a taller electronic circuit. In some embodiments the height of the electronic circuit 25, with or without the mounting sheet 39, can be greater than the height of the protective pocket 23. In such a case the cover sheet 17 or base sheet 15 might bulge out slightly. Alternatively, a portion of the cover sheet 17 can be hollowed out to accommodate the microchip 35.

In one embodiment the sheet assembly 11 is assembled by applying the adhesive 37 to the base sheet 15 and then bonding the mask sheet 19 to the to the base sheet 15. The windows 21 are generally cut out of the mask sheet 19 prior to assembly of the sheet assembly 11. The electronic circuits 25 can then be inserted into the windows 21 using a label applicator. Alternatively, the electronic circuits 25 can be applied to the base sheet 15 and then the mask sheet 19 can be bonded to the base sheet 15 with the windows 21 placed around the electronic circuits 25. In either case, the cross-sectional footprint of the electronic circuit 25 can be made to fit within the window 21. The adhesive 37 can then be applied to the cover sheet 17 and/or the mask sheet 19 and the cover sheet 17 is bonded to the mask sheet 19 so that the electronic circuits 25 are entirely enclosed within the protective pockets 23. An adhesive-free region 41 can be formed on the inner surface of the cover sheet 17 so that adhesive does not contact the microchip 35. Thus the electronic circuit 25 is bonded to the base sheet 15 and not to the cover sheet 17. In other embodiments the electronic circuit 25 is bonded to both the cover sheet 17 and base sheet 15 or to the cover sheet 17 alone. The electronic circuit 25 can also be placed in the protective pocket 23 without using any adhesive to secure the electronic circuit 25.

Figure 3:
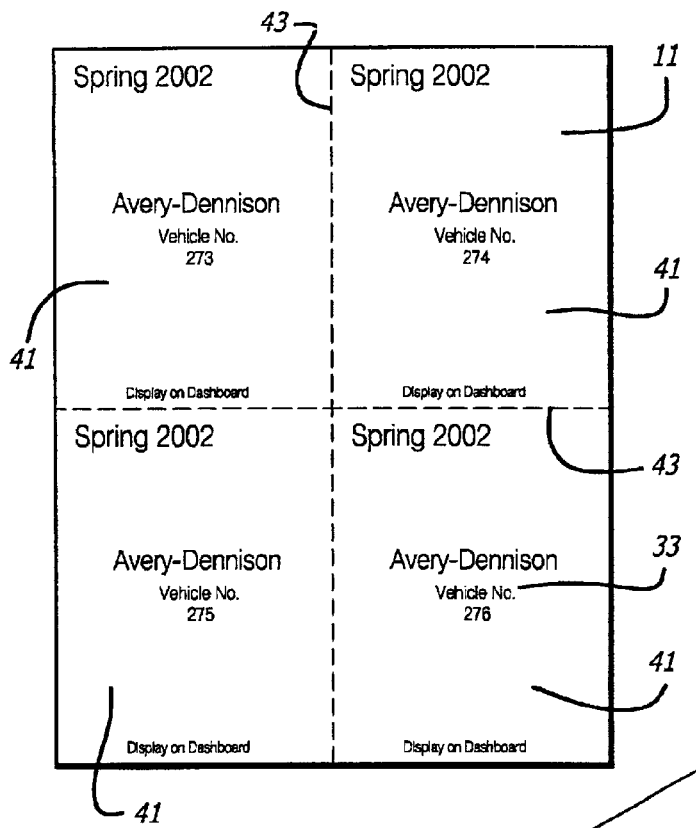
FIG. 3 is a top-plan view of a face of an RFID tag or label sheet assembly.

In embodiments such as that illustrated in FIGS. 1 and 4 utilizing multiple protective pockets 21 with multiple electronic circuits 25, provisions are made for separating the sheet assembly 11 into multiple sub-assemblies 41 each including a protective-pocket enclosed electronic circuit 25 thereby producing separate RFID labels or tags. To this end, the sheet assembly 11 can include separation lines 43. The separation lines 43 can be cleanly die-cut, for example, or can include cuts and ties. The separation lines 43 can be cut into the sheet assembly 11 following the adhesive bonding steps. In the embodiment of FIGS. 1, 3 and 4, one vertical and one horizontal separation line 43 is cut all the way through the cover sheet 17, mask sheet 19, and base sheet 15 to separate the sheet assembly into four sub-assemblies each having a protective pocket 23 enclosed electronic circuit 25.

The completed sheet assemblies 11 can then be passed through the printer 13 of FIG. 1 as described previously to provide customized variable imprinting on the cover sheet 17. The laser printer 13 can print images on the sheet assembly 11 such that each of the sub-assemblies 41 has the same or images different from the other sub-assemblies 41. FIG. 3 is a top-plan view of the sheet assembly 11 after passing through the laser printer 13. Each of the sub-assemblies 41 has a different image printed on it. In the given example the sub-assemblies 41 are to be used on the dashboard of a vehicle and each has a different vehicle printed thereon. The particular design to be printed on the sheet assemblies 11 can be controlled through a computer associated with the laser printer 13.

After printing, the sheet assemblies 11 are separated along the separation lines 43 to form a plurality of laser imprinted RFID labels or tags. The labels, in particular can be manufactured by adding an additional step to the above described adhesive bonding step. An additional adhesive layer can be added to the outside of the base sheet 15 along with a liner layer covering the additional adhesive layer. Thus, after separating the laser imprinted RFID labels, the liner layer can be removed from the back to expose the adhesive layer and the label can be stuck to a desired object. Alternatively, the adhesive layer and liner layer can be attached to the cover sheet 17.

The external transceiver 31, diagrammatically illustrated in FIG. 2, can include an antenna and a reader as is known in the art. The external transceiver 31 can also comprise a separate transmitter, receiver and reader. The external transceiver 31 sends a command 45 to the electronic circuit 25 and receives the response 29 from the electronic circuit 25. The electronic circuit 25 serves as a transponder. The response from the electronic circuit 25 can be identification information. The identification information is stored in the microchip 35 and can be an ID code or the microchip 35 can be used as a data carrier, with information being written to and updated on the microchip 35 on the fly. It is advantageous for the microchip 35 to be a passive device so that it does not require a battery which would increase the size and weight and shorten the life of the RFID labels or tags. However, an on-board battery or other power supply can be desirable in other embodiments.

The RFID labels or tags of the present invention can be used in many applications. For example, the RFID labels or tags can be used as part of a payment system. The reader of the external transceiver 31 can communicate with a database of the identification information and corresponding customer information so that payments can be arranged between customers and the payment system.

The RFID labels or tags of the present invention can also be used as part of a security system having an indicator for notifying security personnel when the external transceiver 31 receives identification information from the RFID labels or tags.

The RFID labels or tags of the present invention can further be used in systems for such applications as product authentication, ticketing, library management and supply chain management applications by using the RFID labels or tags to transmit identification information to the system.

In yet another application, the RFID labels or tags of the present invention can be used as shipping labels or tags corresponding the laser printer applied image and the identification information provided by the microchip 35 to goods.

It is to be understood that the RFID labels or tags of the present invention are not limited to operation in the radio frequency range. They can also operate using other electromagnetic frequencies. In addition, they can use sound or different types of radiation to communicate between the protective pocket 23 and the external transceiver 31. The present invention can also utilize additional sheets other than just the three described herein. For example, four or more sheets of paper can be used. Furthermore, the present invention can utilize materials other than sheets of paper to form the sheet assembly 11. For example, plastic sheets can be used instead. The present invention is also not limited to use with a laser printer. Other types of printing such as ink-jet, dot-matrix or web-printing can be used instead and the protective pocket 23 can still serve to protect the electronic circuit 25. Also, the electronic circuit 25 can be placed in the protective pocket 23 in orientations other than the orientation described above.

It is to be understood that other embodiments may be utilized and structural and functional changes may be made without departing from the scope of the present invention. The foregoing descriptions of embodiments of the invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

We claim:

1. A method of forming a printable electronic sheet assembly, comprising the steps of:

forming a sheet assembly having an ink receptive paper upper layer, a lower layer, and an intermediate layer with at least one opening in the intermediate layer to receive an electronic circuit having a height approximately equal to or less than the thickness of said intermediate layer said assembly being of substantially constant thickness;

bonding said three layers together to form a flexible sheet less than 15 thousandths of an inch thick; said sheet assembly being approximately 8½×11 inches or A-4 paper sheet size;

printing on said sheet assembly using a printer which subjects said sheet assembly to heat and pressure;

cutting said sheet assembly into reduced size multi-layer assemblies each including at least one of said electronic circuits; and subsequently applying high frequency R.F. signals to said reduced size assemblies.

2. An imageable electronic-identification sheet assembly comprising:

a base sheet;

an ink receptive cover sheet upon which a laser printer applied image is formed by passing the sheet assembly through a print path of a laser or ink jet printers;

a mask sheet having a window formed therein, the mask sheet bonded between the base and cover sheets to form a protective pocket within the window for protecting an electronic circuit bonded entirely within the protective pocket from the heat and pressure applied by the laser or ink jet printer when printing an image on the cover sheet;

a transmission device within the protective pocket for communicating identification information from the electronic circuit to an external receiver outside the protective pocket; and said assembly presenting an over-all constant thickness equal to or less than 0.015 inch for reliable feeding through the printer.

3. The sheet assembly of claim 2, further comprising additional windows in the mask sheet forming protective pockets for protecting additional electronic circuits bonded entirely within the protective pockets.

4. The sheet assembly of claim 3, further comprising separation lines formed in the sheet assembly for separating the sheet assembly into multiple sub-assemblies each including a protective-pocket enclosed electronic circuit.

5. The sheet assembly of claim 4, wherein the separation lines are die cut.

6. The sheet assembly of claim 2, wherein:

the transmission device is an antenna forming a part of the electronic circuit.

7. The sheet assembly of claim 2, wherein:

the cross-sectional footprint of the electronic circuit fits within the windows in the mask sheet.

8. The sheet assembly of claim 2, further comprising permanent adhesive on the base sheet bonded to the mask sheet and the electronic circuit.

9. The sheet assembly of claim 2, further comprising permanent adhesive on the cover sheet bonded to the mask sheet.

10. The sheet assembly of claim 8, further comprising adhesive on an outside surface of the sheet assembly for adhering the sheet assembly to an object as a label.

11. The sheet assembly of claim 2, wherein the sheet assembly is less than 15 thousandths of an inch thick and is of approximately 8½×11 inches or A-4 paper sheet size for feeding through a laser printer.

12. The sheet assembly of claim 2, wherein the base and cover sheets are substantially 20 pound bond paper.

13. The sheet assembly of claim 2, wherein the mask sheet is formed from paper in the range from approximately 60 pound to approximately 80 pound bond paper.

14. The sheet assembly of claim 2, wherein the electronic circuit is a radio frequency identification transponder.

15. The sheet assembly of claim 14, wherein the radio frequency identification transponder is a passive device.

16. The sheet assembly of claim 4, wherein each of the sub-assemblies is a shipping label and both the laser printer applied image and the identification information correspond to goods.

17. The sheet assembly of claim 2 wherein the electromagnetic radiation is radio-frequency waves.

18. A system including the assembly of claim 2 and further comprising a transceiver including a transmitter, a receiver and a reader.

19. A method for forming an imageable electronic-identification sheet assembly, comprising the steps of:
  bonding at least one electronic circuit into a protective pocket in the sheet assembly formed by bonding together a base sheet, an ink receptive paper cover sheet, and a mask sheet with at least one window in the mask sheet for framing the electronic circuit, the sheet assembly having a thickness equal to or less than fifteen thousandths of an inch; said assembly having a substantially constant thickness;
  printing on said sheet assembly using the laser or ink jet printer which subjects said sheet assembly to heat and pressure; and
  subsequently communicating with the electronic circuit within the protective pocket using electromagnetic radiation to obtain identification information.

20. The method of claim 19, further comprising the step of bonding additional electronic circuits into additional protective pockets formed from additional windows in the mask sheet.

21. The method of claim 19, further comprising the step of passing the sheet assembly through the print path of a laser printer and printing a laser printer applied image on the cover sheet.

22. The method of claim 21, further comprising step of communicating with a receiver external to the protective-pocket using electromagnetic radiation transmitted by a transmission portion of the electronic circuit within the protective-pocket.

23. The method of claim 20, further comprising forming separation lines in the sheet assembly for separating the sheet assembly into multiple sub-assemblies each including a protective pocket enclosed electronic circuit.

24. The method of claim 23, further comprising the step of die-cutting the separation lines.

25. The method of claim 23, further comprising the step of separating the sheet assembly along the separation lines into multiple sub-assemblies each including a protective-pocket enclosed electronic circuit.

26. The method of claim 21, further comprising the step of separating the sheet assembly having the laser printer applied image into multiple sub-assemblies by separating the sheet assembly along the separation lines.

27. The method of claim 26, wherein each of the sub-assemblies has a laser printer applied image applied during the step of passing the sheet assembly through the print path of laser printer and printing a laser printer applied image on the cover sheet.

28. The method of claim 19, wherein the step of bonding the at least one electronic circuit into the protective pocket further comprises the step of placing permanent adhesive on the base sheet, cover sheet, mask sheet and at least one electronic circuit.

29. The method of claim 28, wherein the step of bonding the electronic circuit into the protective pocket further comprises the step of bonding the electronic circuit to the base sheet using permanent adhesive.

30. The method of claim 28, further comprising the step of placing adhesive on an outside surface of the sheet assembly for adhering the sheet assembly to an object as a label.

31. The method of claim 19, further comprising the step of communicating with a receiver external to the protective-pocket using electromagnetic radiation transmitted by a transmission portion of the electronic circuit within the protective-pocket.

32. The method of claim 19, further comprising the step of receiving the identification information at an external receiver outside the protective pocket.

33. The method of claim 19, wherein the communicating step is achieved by transmitting electromagnetic radiation from a transmission device external to the protective pocket to the electronic circuit, powering the electronic circuit using the electromagnetic radiation, and transmitting the identification information from a transmission portion of the electronic circuit to a receiver outside the protective pocket.

34. The method of claim 19, wherein the electromagnetic radiation is radio-frequency waves.

35. An imageable electronic-identification sheet assembly comprising:
  a base sheet;
  a cover sheet upon which a laser printer applied image is formed by passing the sheet assembly through a print path of a laser printer;
  a mask sheet having a window formed therein, the mask sheet bonded between the base and cover sheets to form a protective pocket within the window for protecting an electronic circuit bonded entirely within the protective pocket from the heat and pressure applied by the laser printer when printing an image on the cover sheet;
  a transmission device within the protective pocket for communicating identification information from the electronic circuit to an external receiver outside the protective pocket;
  said sheet assembly being equal to or less than 0.015 inch in thickness;
  said electronic circuit having a thickness equal to or less than the thickness of said mask sheet;
  the periphery of said assembly being of a uniform predetermined thickness, whereby the entire sheet assembly has a thickness no greater than said predetermined thickness; and
  said cover sheet or said base sheet being formed of ink receptive paper.

36. An imageable electronic-identification sheet assembly as defined in claim 35, wherein said assembly has a plurality of electronic circuits mounted in windows in the mask sheet, and wherein the size of said assembly is approximately 8½×11 inches or approximately equal to A-4 size paper.

* * * * *